US011488018B1

(12) United States Patent
Woo

(10) Patent No.: US 11,488,018 B1
(45) Date of Patent: Nov. 1, 2022

(54) HIGH-BANDWIDTH NEURAL NETWORK

(71) Applicant: Rambus Inc., San Jose, CA (US)

(72) Inventor: Steven C. Woo, Saratoga, CA (US)

(73) Assignee: Rambus Inc., San Jose, CA (US)

( * ) Notice: Subject to any disclaimer, the term of this patent is extended or adjusted under 35 U.S.C. 154(b) by 220 days.

(21) Appl. No.: 16/908,024

(22) Filed: Jun. 22, 2020

Related U.S. Application Data

(60) Provisional application No. 62/930,080, filed on Nov. 4, 2019, provisional application No. 62/867,799, filed on Jun. 27, 2019.

(51) Int. Cl.
*G06N 3/08* (2006.01)
*G06N 3/04* (2006.01)
*G06N 3/063* (2006.01)

(52) U.S. Cl.
CPC ............ *G06N 3/08* (2013.01); *G06N 3/04* (2013.01); *G06N 3/063* (2013.01)

(58) Field of Classification Search
CPC ............ G06N 3/08; G06N 3/04; G06N 3/063
See application file for complete search history.

(56) References Cited

FOREIGN PATENT DOCUMENTS

EP 0469885 A2 * 2/1992 ............. G06F 15/80

OTHER PUBLICATIONS

Milkawa et al. "Neuromorphic computing based on Analog ReRAM as low power solution for edge application", IEEE, Jun. 20, 2019 https://ieeexplore.ieee.org/document/8739720 (Year: 2019).*
Takumi Mikawa et al. "Neuromorphic computing based on Analog ReRAM as low power solution for edge application" 2019 IEEE, 4 pages (pp. 56-59).

* cited by examiner

*Primary Examiner* — Yogeshkumar Patel
(74) *Attorney, Agent, or Firm* — Charles Shemwell

(57) ABSTRACT

One or more neural network layers are implemented by respective sets of signed multiply-accumulate units that generate dual analog result signals indicative of positive and negative product accumulations, respectively. The two analog result signals and thus the positive and negative product accumulations are differentially combined to produce a merged analog output signal that constitutes the output of a neural node within the subject neural network layer.

20 Claims, 9 Drawing Sheets

Fig. 1 Die-Integrated Neural-Net (NN) Engine with pipelined input data and signed-analog multiply-accumulate

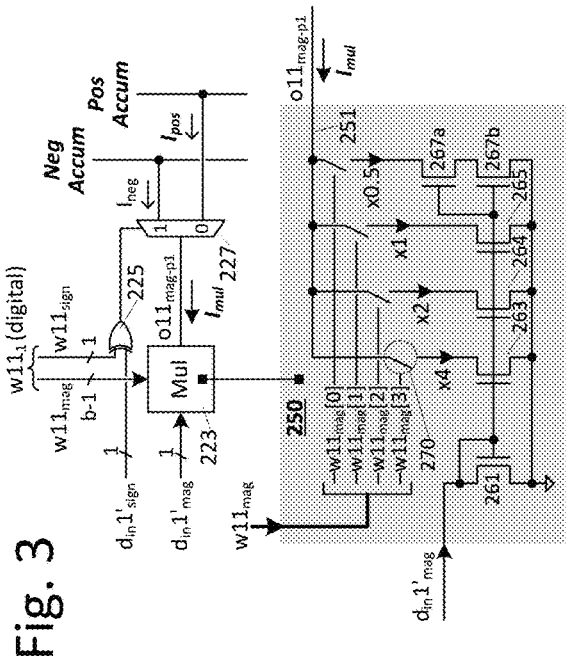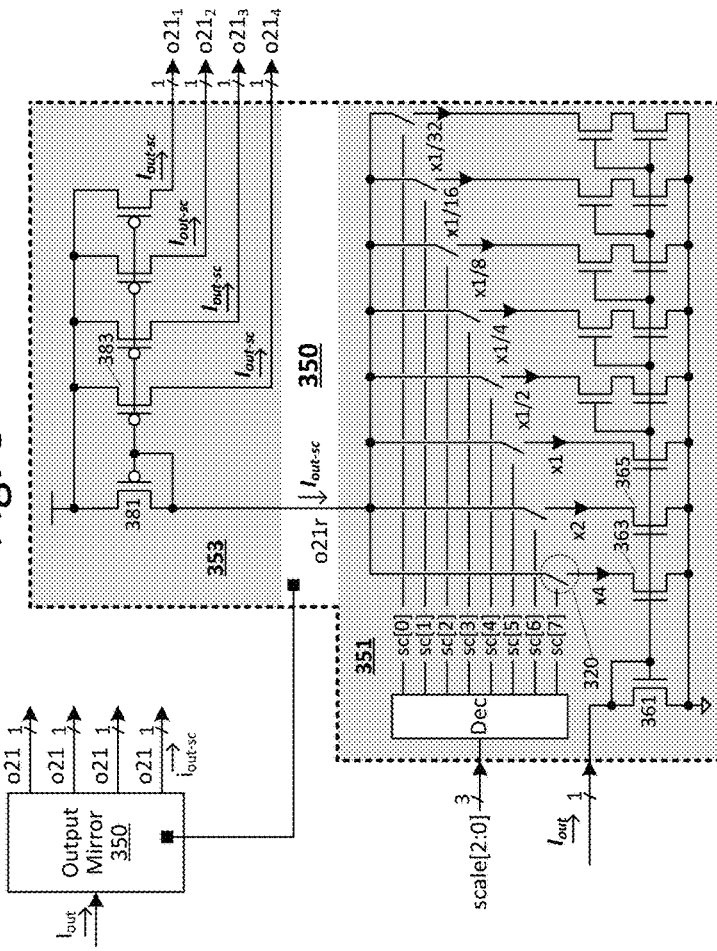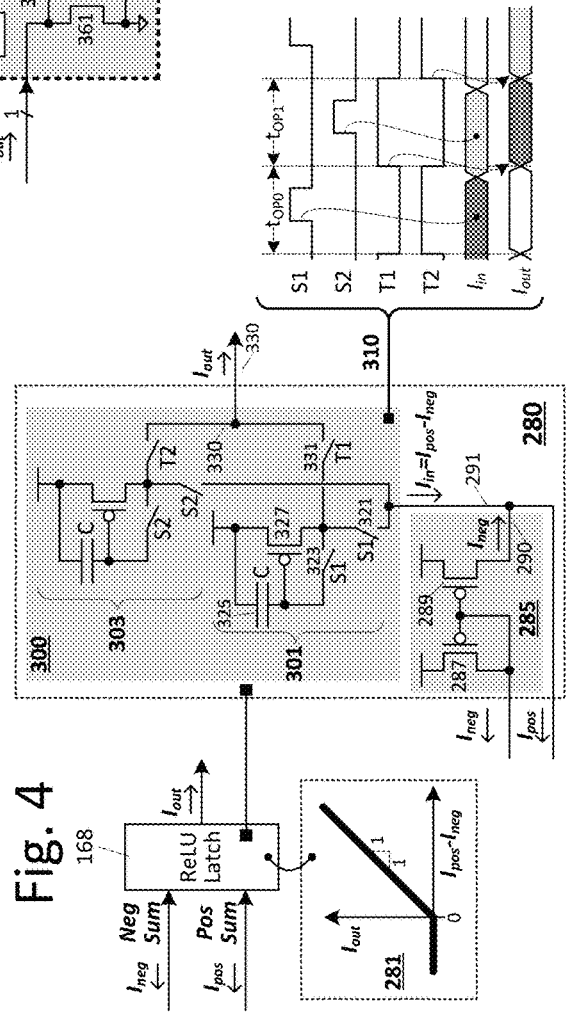
Fig. 5
Fig. 3
Fig. 4

US 11,488,018 B1

HIGH-BANDWIDTH NEURAL NETWORK

INCORPORATION BY REFERENCE

This application hereby claims priority to and incorporates by reference U.S. Provisional Patent Application No. 62/930,080 filed Nov. 4, 2019 and U.S. Provisional Patent Application No. 62/867,799 filed Jun. 27, 2019.

TECHNICAL FIELD

The present disclosure relates to the field of digital signal processing and more specifically to integrated-circuit neural network implementation.

DRAWINGS

The various embodiments disclosed herein are illustrated by way of example, and not by way of limitation, in the figures of the accompanying drawings and in which like reference numerals refer to similar elements and in which:

FIG. 3 illustrates an embodiment of a hybrid digital/analog magnitude multiplier that may be used to implement magnitude-multiplier of FIG. 2;

FIG. 4 illustrates an embodiment of a latch that may be implemented within the neural nodes shown in FIGS. 1 and 2 to produce a rectified output in response to accumulation currents supplied by a dual-output multiply-accumulate (MAC) unit;

FIG. 5 illustrates an embodiment of an output mirror having a selective scaling function and a mirroring output driver;

DETAILED DESCRIPTION

Figure 1:
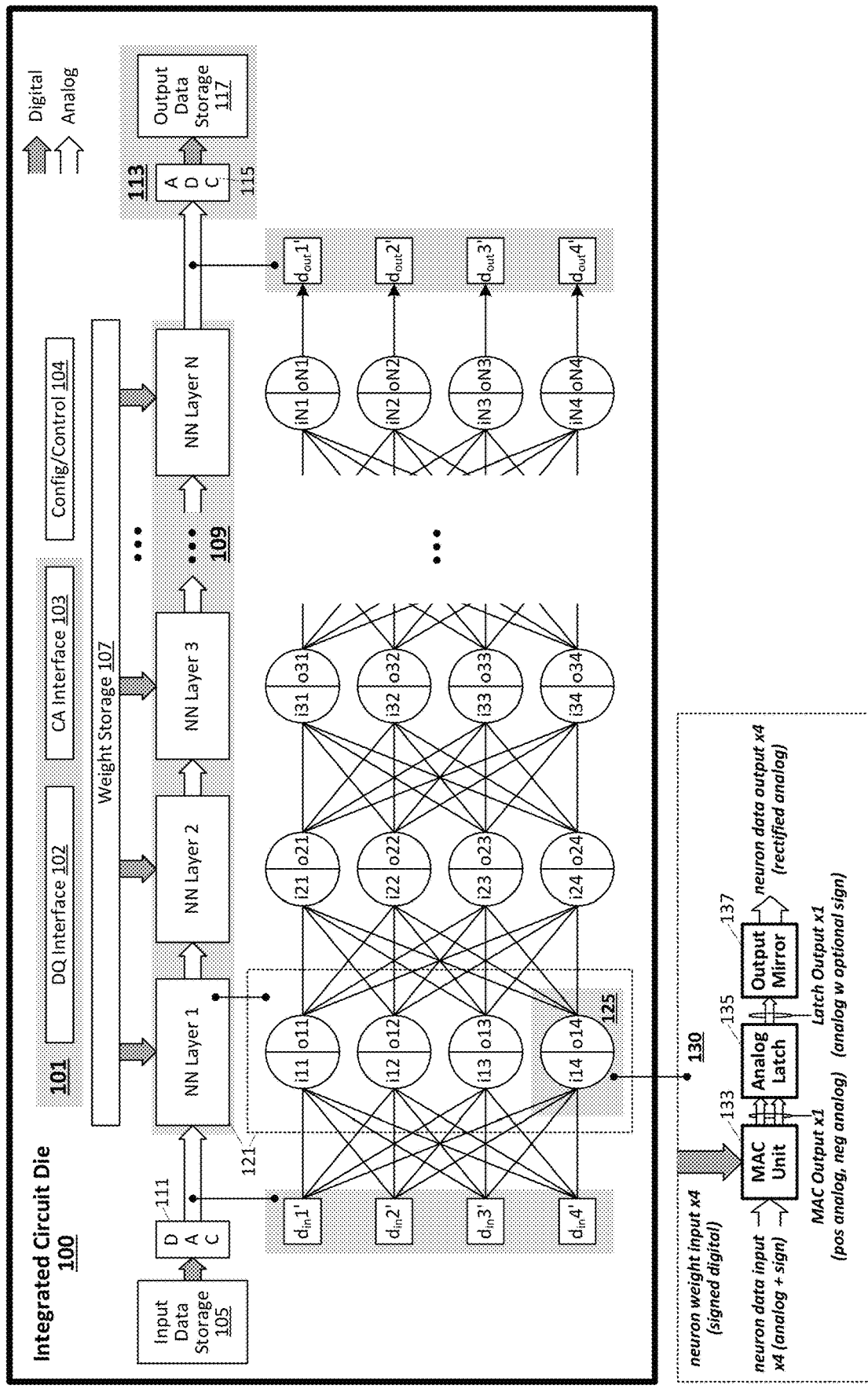
FIG. 1 illustrates an embodiment of a semiconductor-die-integrated neural-net engine.

In various embodiments disclosed herein, one or more neural network layers are implemented by respective sets of signed multiply-accumulate units that generate dual analog result signals indicative of positive and negative product accumulations, respectively. In a number of implementations, the two "polar" analog results—positive and negative product accumulations—are differentially combined to produce a merged analog output signal that constitutes the output of a neural node within the subject neural network layer (i.e., output of an artificial neuron). In rectifying embodiments, the merged analog output is limited to the positive domain so that no explicit sign bit (or signal) is generated. In embodiments that permit both positive-domain and negative-domain outputs, a sign bit is generated (according to relative magnitudes of the positive and negative product accumulations) and output together with the merged analog result, thus forming a hybrid digital/analog neural output. In other embodiments, imaging data arrays or other array-format data to be processed within the neural network is organized within on-chip storage to enable high-throughput processing of array sub-regions, referred to herein as "data tiles," with non-redundant read-out and pipelined data retrieval/neural-net processing operations. For example, in one embodiment, data corresponding to overlapping 2×2 image tiles (e.g., each tile constituted by four pixel values disposed in two rows and two columns) is stored in a dynamic random access memory (DRAM) core such that each row activation (page retrieval) within the core yields a collection of neighboring tiles that may be efficiently fed into the neural network.

In a number of embodiments, the aforementioned multiply-accumulate (MAC) units and DRAM core are implemented within a single integrated-circuit die to enable low-latency data transfer from the DRAM to chains and/or parallel implementations of the MAC units, obviating time/power-consuming data serialization and chip-to-chip data transfer. In other embodiments, low-latency chip-to-chip data exchange, by way of through-silicon vias for example, is carried out with or without data serialization to enable high-bandwidth data transfer between a memory IC and a MAC-unit IC disposed in a stacked-die integrated circuit package or other multi-die IC package. In both single-die and multi-die-package embodiments, hybrid analog-digital MAC units execute current-mode multiply accumulate operations in which signed digital weighting values from the memory array (or register file or other storage) are applied without conversion (i.e., in digital form) to selectively enable binary-weighted current contributions to polar wire-summed outputs (positive accumulations and negative accumulations in separate current-mode wire sums)—an approach that both multiplies the digital operands with counterpart analog (current-mode) operands and wire-sums multiple parallel multiplications with extremely low latency (high speed) and small circuit footprint. In a number of embodiments, current-mode latches are disposed at respective neural node outputs, with each "i-latch" having circuitry to merge the positive and negative accumulations generated by the participating MAC units (i.e., subtracting one current-mode signal from the other) and to latch the merged result for output to one or more downstream neural nodes during generation of a subsequent merged result, all without digitization between neural nodes (i.e., no analog-digital conversion at interface between neural nodes). By this arrangement, a pipelined sequence of multiply-accumulate operations ripples through the layers of the neural network over a corresponding sequence of operation intervals, $t_{OP}$, with (i) each neural node generating a new output result (according to the inputs from its upstream neighbors) in each $t_{OP}$ interval, and (ii) all neural nodes executing respective neural-net operations during a given $t_{OP}$ interval. That is, a neural-net operation implemented by N neural layers will complete in N $t_{OP}$ intervals and individual neural-net operations may be commenced in successive $t_{OP}$ intervals (i.e., multiple neural-net operations propagating through neural network concurrently, staggered by time $t_{OP}$ to implement a neural-net pipeline) such that the rate at which neural-net operations are completed (operational throughput) is $1/t_{OP}$. These and other features and embodiments are presented in greater detail below.

FIG. 1 illustrates an embodiment of a semiconductor-die-integrated neural-net engine 100 having a signaling interface 101, configuration/control circuitry 104, input data storage 105, weighting storage 107, neural network 109, input-stage digital-to-analog converter (DAC) 111, and output stage 113, the latter implemented by an analog-to-digital converter (ADC) 115 and output data storage 117. Digital weights from weighting storage 107 are supplied directly to individual neural layers (1, 2, . . . , N) of neural network 109, while digital input data from data storage 105 is converted to analog form within DAC 111 and supplied to an initial neural layer 121. In a number of embodiments, an on-chip dynamic random access memory (DRAM) serves as both input data storage 105 and weighting storage 107 (and optionally the output data storage 117) with the input data and weight data stored in respective regions (or address ranges) of the DRAM—memory cores/arrays implemented by SRAM, Flash cells or any other practicable integrated-circuit storage may be used instead in all disclosed embodiments—and then read-out on demand to support neural network processing. Additional register files, buffers, shift registers and the like my be disposed between the on-chip DRAM and neural network interface. For example, a register file may be provided as part of weight storage 105 to store weights retrieved from the DRAM during system startup (updating as necessary) and output those weights to the neural network during data processing operations. Similarly, one or more shift registers or other buffers may be provided as part of input-data storage 105 to efficiently deliver input data to the input stage of the neural network—an operation discussed in greater detail below.

In the FIG. 1 embodiment, each component layer of neural network 109 (i.e., "NN Layer") is implemented by a set of artificial neurons ("neural nodes") that are cross-coupled to all or some of the neural nodes in preceding and succeeding neural net layers (or, in the case of the initial or final neural net layers, to input or output nodes in the neural-net interfaces). In the conceptual embodiment shown, each of 'N' neural-net layers has four fully-connected neural nodes 125 as shown in the expanded view of initial neural net layer 121 such that each individual neural node 125 (i) receives four inputs (and corresponding weighting values, not specifically shown), respectively, from the four neural nodes in the preceding/upstream layer, and (ii) outputs the neural node result to each of the four neural nodes in the succeeding/downstream layer. Again, each neural node 125 in initial layer 121 receives inputs from the input-data DAC, and each neural node in the final layer drives a single-instance output to output stage 113.

Referring to detail view 130, each neural node 125 includes a multiply-accumulate (MAC) unit 133, analog latch 135 and output mirror 137. MAC unit 133 receives neuron input data values—in this initial-layer example, four input data values from DAC 111 each constituted by an analog magnitude signal and a sign bit—and generates two analog output signals corresponding to the polar (positive and negative) product accumulations discussed above. Analog latch 135 merges the positive and negative product accumulations, subtracting the two analog signals delivered by MAC unit 133, to produce a differential result and then latches the differential result within an analog latching element throughout an operational interval, $t_{OP}$, in which a subsequent differential result is generated. Accordingly, the differential result generated during a given operational interval is latched at the conclusion of that interval and thereby made available to downstream neural nodes throughout the ensuing operational interval—pipelining processing operations within the N-layer neural network such that a new result becomes available at the neural network output every operational interval (i.e., after an N*$t_{OP}$ latency required for propagation of an initial set of inputs through N layers of the neural network).

In a number of embodiments (or configurations), the analog latch performs a rectifying function that limits the sign of the analog output to the positive domain (i.e., output ranges from 0 to maximum positive value) so that no explicit sign bit need be conveyed to the downstream neural nodes. In other embodiments or configurations, the analog latch outputs a signed analog value in the form of a current-mode analog magnitude signal and a sign bit (or sign signal) indicating output polarity (note that "current-mode analog signal" refers to a signal in which level or amplitude of current flow is representative of quantitative value). In either case, output mirror 137 replicates at least the current-mode analog magnitude signal onto output lines coupled to respective downstream (next-layer) neural nodes—an arrangement that avoids digitization in the layer-to-layer interfaces of the neural pipeline, reducing latency, power consumption and die-area footprint (i.e., no analog-to-digital (A/D) and digital-to-analog (D/A) conversion circuitry at layer interface).

In a number of embodiments, weighting values to be applied within the neural pipeline during inference or other operations are iteratively adjusted in one or more training events before being written into weight storage 107 (and/or backing DRAM) in final/hardened form. In one implementation, for example, weighting values are generated off-die during neural-network training and then written to on-chip DRAM (e.g., implementing weight storage 107, at least) via command/address (CA) and data (DQ) interfaces, 102 and 103 (i.e., constituents of signaling interface 101), the former receiving memory write commands and the latter receiving weighting values. In other embodiments, the weighting values may be adjusted in-situ during neural-net training, with weighting values read out of weighting data storage 107 following a training iteration, adjusted in accordance with neural pipeline results (and other information) and written back to weighting data storage in a sequence of memory read and write transactions. Input data is similarly written to input data storage 105 (e.g., DRAM that also constitutes weighting data storage 107) via the CA and DQ interfaces for eventual on-die readout and delivery to neural network 109.

In addition to data read/write commands, the command/address interface may receive configuration commands and data (configuration data may alternatively or additionally be conveyed via the DQ interface) to be programmed within configuration/control circuitry 104. For example, configuration data may be programmed within configuration/control circuitry 104 to switchably interconnect otherwise fungible/interchangeable neural-net layers and/or neural nodes (and thus form a programmably configured neural network), switchably connect input-DAC 111 and output ADC 115 to initial and final layers of the neural network, configure scaling operations, rectifying function, and so forth in individual neural net layers or neural nodes (e.g., configuring individual neural net layers or neural nodes for convolution or perceptron (or other) functionality), and so forth.

Figure 2:
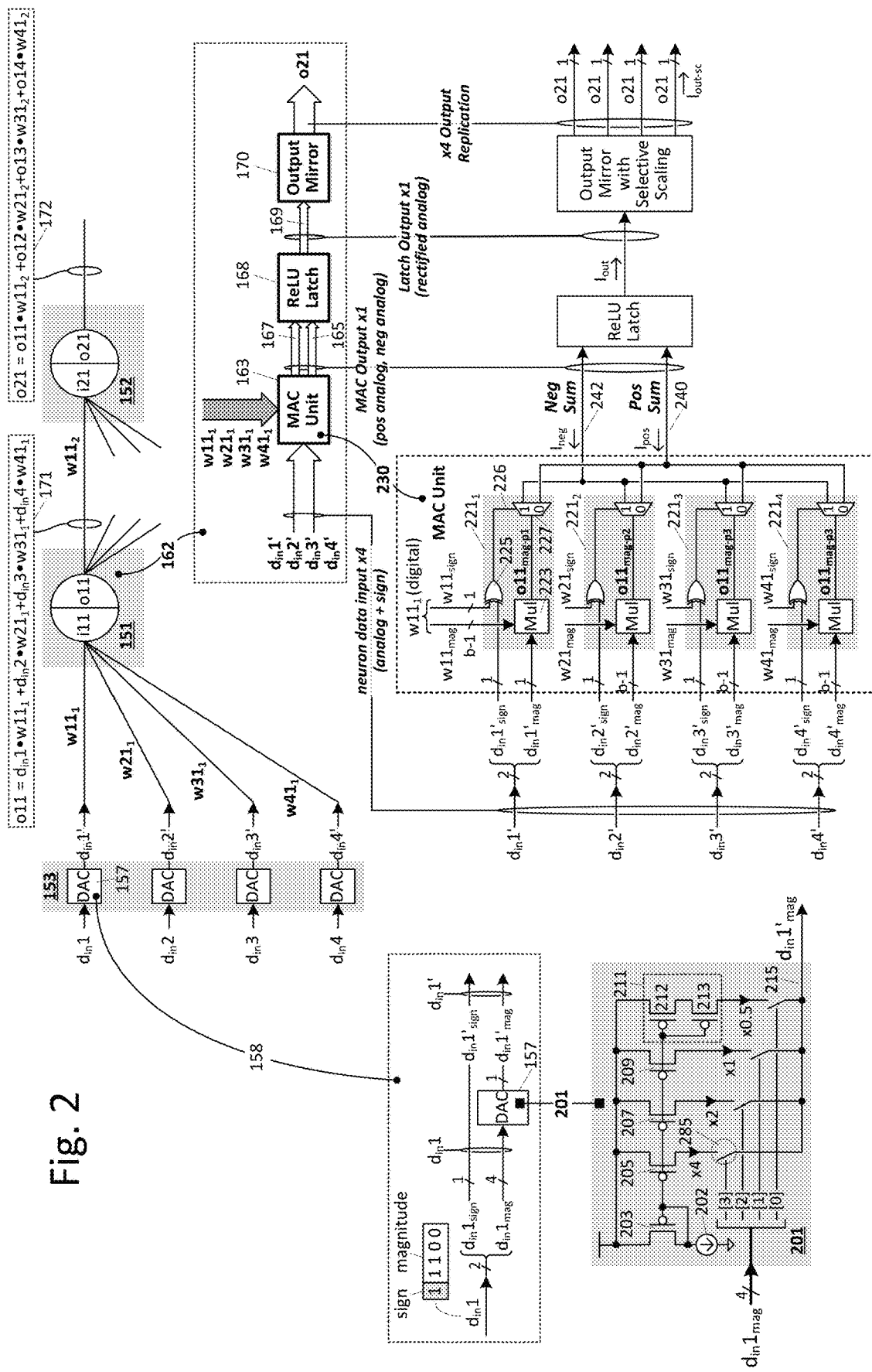
FIG. 2 illustrates embodiments of a neural node and input DAC (digital-to-analog converter) that operate on digital input data and digital weighting values conveyed in signed magnitude form.

FIG. 2 illustrates embodiments of a neural node 151 and input-DAC 153 that operate on digital input data and digital weighting values conveyed in signed magnitude form. That is, each digital input value and weighting value is a tuple constituted by a sign bit that indicates polarity (e.g., 0=positive, 1=negative) and a set of magnitude bits—four bits in the depicted example and those below, though additional bits may be provided in all cases to avoid arithmetic overflow, support wider numeric ranges, etc. Thus, maximum positive and negative values have the same magnitude value (e.g., '1111' in the four-bit example presented) but opposite signs ('0' and '1'). As shown, each of four input data values, $d_{in}1$-$d_{in}4$, is supplied to a respective component DAC 157 (i.e., within multi-input DAC 153) which, as shown in detail view 158, converts the 4-bit digital magnitude component (i.e., $d_{in}1_{mag}$) into a current-mode analog magnitude signal ($d_{in}1'_{mag}$) having one of sixteen current levels according to the numeric value of the digital magnitude, outputting the analog magnitude signal and digital sign bit as a two-signal tuple (a "signed analog" signal, $d_{in}1'$) to the neural nodes within the initial layer.

Each neural node within the initial layer (exemplified by neural node 151) receives one or more (or all) of the signed analog signals supplied by component DACs 157 within input DAC 153 together with digital weight values to be respectively applied to the signed analog signals. Thus, referring to exemplary detail view 162, MAC unit 163 (a component of neural node 151) receives four signed analog input signals ($d_{in}1'$-$d_{in}4'$) and four signed digital weight values ($w11_1$-$w41_1$), multiplying each signed analog signal with a corresponding one of the digital weights to produce a current-mode multiplication product and contributing individual current-mode products (e.g., drawing a current having a magnitude corresponding to the product) to either a "positive" accumulation result 165 or "negative" accumulation result 167 according to the signs of the input data and weight data multiplicands. In the FIG. 2 example, the positive and negative accumulation results are supplied to a rectifying latch 168 (rectifying linear unit or ReLU latch) which responsively generates a merged positive-domain output 169 for output (via output mirror 170) with optional scaling to the next neural-net layer (or to an output stage if only a single neural-net layer is implemented). Neural node 152 within a downstream neural-net layer performs a like signed multiply-accumulate operation with respect to the current-mode result signal from neural node 151 and (possibly) other neural nodes in the initial neural net layer (i.e., such that neural nodes 151 and 152 generate respective multiply accumulate results as shown at 171 and 172).

Still referring to FIG. 2, detail view 201 presents a current-mode implementation of component DAC 157—in this example having a current source 202 and diode-configured transistor 203 coupled in a current-mirror configuration with binary-weighted transistors 205, 207, 209 and 211 (the latter being a series-coupled pair of transistors 212 and 213) that form respective legs of the DAC. Current-source 202 drives the voltage at the gate of transistor 203 (P-MOS field-effect transistor in this case to yield a current-sourcing rather than current-sinking output) and thus at the gates of transistors within all legs of the DAC to a bias point sufficient to establish linearity between the binary-weighted legs (i.e., driving the gate-to-source voltage of transistor 203 to a point corresponding to the current drawn by current-source 202). Respective bits of the four-bit digital magnitude input ($d_{in}1_{mag}$ in this example) are supplied to switching elements 285 (e.g., N-type or P-type FETS) within respective legs to enable or disable those legs from contributing to a net output current ($d_{in}1'_{mag}$) at DAC output node 215. In one embodiment, the current flowing through each leg (assuming that the leg is enabled to contribute current to output node 215) is weighted through transistor size ratioing so that the x4 leg (through transistor 205) contributes twice as much current as the x2 leg which contributes twice as much current as the x1 leg which contributes twice as much current as the x0.5 leg. Note that the x0.5, x1, x2 and x4 current contributions are relative and thus may be viewed as x1, x2, x4, x8 or any other relative set of values that enables production of 16 different current levels (the lowest of which is no current in the depicted example, but instead may be a baseline current). Size ratioing may be achieved by implementing transistors with different width-length (aspect) ratios (e.g., with x4 transistor 205 having a W/L value twice that of x2 transistor 207) and/or by ganging transistors in parallel (e.g., 4 instances of x1 transistor coupled in parallel to implement the x4 leg) or in series (e.g., series-coupled transistors 212 and 213 implemented by respective x1-sized transistors to double the effective length of the net transistor channel and thus yield the x0.5× weighting). Various other current-mode DACs may be implemented in alternative embodiments, including current-sinking DACs, DACs having a bit-depth greater than or equal to four, etc. Also, the output current representative of $d_{in}1_{mag}$ may be mirrored (replicated) as necessary to supply multiple neural nodes.

FIG. 2 presents a more detailed view of MAC unit 163 at 230. As shown, each of the four signed-analog input values ($d_{in}1'$-$d_{in}4'$) is supplied, along with a corresponding one of the four signed digital weight values ($w11_1$-$w11_4$), to a respective one of four dual-output multipliers $221_1$-$221_4$. Referring to dual-output multiplier $221_1$ (the others may be identically implemented), a magnitude multiplier 223 receives the analog input magnitude and digital weight magnitude, multiplying those two values as discussed below to produce a current-mode "product-magnitude," in this case designated "$o11_{mag-p1}$" to emphasize that the output constitutes a first portion (p1) of the complete magnitude result accumulated by MAC unit 163 and thus by neural node 151. The sign bits of the signed-analog input value and digital weight value are exclusively-ORed in gate 225 to drive a product-sign bit 226 to the control input of demultiplexer 227, thereby supplying the current-mode output of magnitude multiplier 223 to either a positive accumulation (current-mode summation) line 240 or a negative accumulation line 242—the dual outputs of dual-output multiplier $221_1$—according to the state of the product-sign. More specifically, if the signs of the input value and weight are the same (incoming values both positive or both negative so that the multiplication product will be positive), XOR gate 225 outputs a logic '0' product-sign that routes the product-magnitude (via demultiplexer 227) to positive accumulation line 240 and, conversely, if the signs of the input value and weight are opposite (so that the multiplication product will be negative), XOR gate 225 outputs a logic '1' product sign to route the product-magnitude to negative accumulation line 242. In one embodiment, magnitude multiplier 223 sinks current so that the product-magnitude signal is represented by the level of current flow into multiplier 223 (i.e., maximum magnitude indicated by maximum current flow into multiplier 223, minimum or zero magnitude indicated by zero current flow) so that the net current flowing on the positive accumulation line ("$I_{pos}$") will be the wired sum of currents flowing into magnitude-multipliers 223 (within respective dual-output multipliers $221_1$-$221_4$) for which the multiplicands have the same sign and the net current flowing on the negative accumulation line ("$I_{neg}$") will bet the wired sum of currents flowing into magnitude-multipliers for which the multiplicands have different signs. Thus, the positive and negative designations of accumulated currents $I_{pos}$ and $I_{neg}$ on output lines 240 and 242, respectively, reflect the sign of the contributing multiplications, not the current-flow direction—both flow (if at all, as either or both may be zero) into MAC unit 163 in the FIG. 2 embodiment.

FIG. 3 illustrates an embodiment of a hybrid digital/analog magnitude multiplier 250 that may be used to implement magnitude-multiplier 223 of FIG. 2. As shown, magnitude-multiplier 250 generates a weighted version of the input current ($d_{in}1'_{mag}$ in this example) by selectively coupling (switchably coupling), in accordance with the digital weighting magnitude, binary-weighted current-sinking legs of the multiplier to a product output node 251 to generate a current-mode multiplication product, $I_{mul}$. More specifically, the input current is supplied to the drain of a diode-configured transistor 261 (N-FET in this current-sinking example) to establish a desired $V_{GS}$ bias point on the gate of transistor 261 and the gates of transistors 263, 264, 265, and 267a/267b which constitute individual binary-weighted legs of the multiplier (i.e., a current mirror). Note that, despite depiction as a component of multiplier unit 250, diode-configured transistor 261 may supply gate voltages for binary-weighted legs of plural multiplier units distributed within respective neural nodes of a neural network 301 (e.g., magnitude-multipliers within respective neurons that respond to the same current-mode input signal). That is, diode-configured transistor 261 may be shared among plural magnitude multipliers 250 and thus viewed as separate from any one multiplier unit. Also, as in the input-DAC, the binary weighting of the multiplier legs may be achieved through transistor ganging and/or ratioing of individual transistor width-length dimensions.

Still referring to FIG. 3, individual bits of the digital weight value are supplied in order of significance to respective switching elements 270 (e.g., implemented by N-FET or P-FET devices) disposed between the binary-weighting transistors and output node 251. By this arrangement, the product current generated (sunk) by a given multiplier unit 250 will match the input current multiplied by a digital weighting value of 0-15. In the specific example shown, the unit step is implemented by a 0.5× weighting leg (e.g., to limit the maximum current) so that the overall range of product currents is 0 to 7.5× the current-mode input in 0.5× increments—sixteen quantization steps (including the no-current zero-value) within an input current having one of 16 different amplitudes. Other multiplication scale factors may be applied.

FIG. 4 illustrates an embodiment of a latch 280 that may be implemented within the neural nodes shown in FIGS. 1 and 2 to yield a rectified output (as shown at 281) in response to accumulation currents $I_{pos}$ and $I_{neg}$ supplied by a dual-output MAC unit. In the depicted embodiment, accumulation current $I_{neg}$ is drawn from a PMOS current mirror 285 to produce a reverse-direction instance of $I_{neg}$ at the current mirror output. That is, $I_{neg}$ is drawn through diode configured transistor 287 to establish a gate voltage on that transistor and on mirror transistor 289 that yields an outflowing (sourced rather than sunk) version of $I_{neg}$ at 290. As shown, accumulation current $I_{pos}$ is drawn from the merger node to yield a differential current draw ($I_{in}$=Ipos−Ineg) on latch-element input line 291.

Still referring to FIG. 4, latch 280 includes a dynamic latch element 300 implemented by parallel dynamic current mirrors 301 and 303 that are alternated between capture and transmit states in successive $t_{OP}$ intervals. That is, during a given $t_{OP}$ interval, one dynamic current mirror is configured for signal capture while the other is configured for signal transmit, with those configurations alternated (swapped, reversed) during each succeeding $t_{OP}$ interval. Referring to the exemplary control signal and input/output waveforms shown at 310, a capture within a given dynamic current mirror (301 or 303) is implemented by pulsing a sample-enable signal (S1 or S2) while the corresponding transmit-enable (T1 or T2) signal is held low. Thus, after a differential current-mode result ($I_{in}$) becomes valid at the input of dynamic current mirror 301 during operational interval topo (i.e., darkly shaded $I_{in}$ in waveform diagram 310), sample-enable signal S1 is pulsed high to close switches 321 and 323 (i.e., drive transistor-implemented switching elements to a conducting state) and thereby capture a voltage on capacitive element 325 (at the gate of transistor 327) according to the current drawn by the input. That is, the input current (difference between $I_{pos}$ and $I_{neg}$ currents sunk by an upstream MAC unit) charges capacitive element 325 to a voltage in accordance with the transconductance of transistor 327 while S1 is high (setting a capture state within dynamic current mirror 301)—a voltage that is isolated (retained/captured) at the gate of transistor 327 after S1 goes low to decouple the gate of transistor from its drain. In the ensuing operational interval, $t_{OP1}$, S1 is held low while T1 is driven high (establishing a transmit mode within dynamic current mirror 301), coupling the drain of transistor 327 to output line 330 (via switch element 331) to drive/transmit a current corresponding to the trapped $V_{GS}$ (the potential captured on capacitive element 325) onto the output line. The operation of dynamic current mirror 303 is identical to that of dynamic current mirror 301, with the capture mode established in 303 during transmit mode of 301 and transmit mode in 303 during capture mode in 301.

Still referring to FIG. 4, for operational intervals in which $I_{neg}$ exceeds $I_{pos}$ (i.e., net multiply-accumulate product for the neural node is negative), no current will flow during capture mode (i.e., within whichever dynamic current mirror is activated), thus yielding a zero-valued output (no current) during the ensuing transmit mode, effecting the rectifying function shown at 281. Further, because $I_{out}$ has a nonzero magnitude only in the positive domain, no explicit sign bit need be output to the downstream neural layer. Accordingly, neural nodes that receive rectified outputs may apply be configured such that the input sign is always zero-valued (e.g., referring to detail view 230 of FIG. 2, for example, by grounding (through hardwired connection or through a multiplexer or like circuit) the sign input of XOR gate 225 otherwise driven by the incoming data signal, or by selecting (through hardwired connection or through a multiplexer or like circuit) the sign bit of the digital weight as the product-sign bit instead of the output of XOR gate 225 (in the hardwired instance, XOR gate 225 may be omitted).

FIG. 5 illustrates an embodiment of an output mirror 350 having a selective scaling function and a mirroring output driver. In the depicted implementation (which may be deployed in place of output mirrors 137 and 170 discussed above), a scaling component 351 of output mirror 350 receives the output signal from a latch element (e.g., current $I_{out}$ from latch 280 of FIG. 4) together with a programmed digital scaling value—in this case an encoded 3-bit value "scale[2:0]" that is decoded to engage one of eight binary-weighted current mirrors that sink a replica of the $I_{out}$ current scaled by a factor of $2^{k-5}$, where k corresponds to the digital scaling value and ranges from 0 to 7. As in the multiplier of FIG. 3, the incoming current-mode signal establishes a gate-source voltage ($V_{GS}$) on diode-configured transistor 361 that is applied to the gates of mirroring transistors 363, 365, etc. (which may individually be implemented by gangs of series and/or parallel-coupled mirroring transistors as discussed above) that are size-scaled to effect the depicted binary weighting factor. Thus, a zero-valued scaling factor is decoded to engage x1/32 scaling leg (i.e., asserting signal sc[0] to switch on a transistor to couple the mirroring transistor(s) of that leg to the scaling circuit output node) and thus yield a scaled output current $I_{out-sc}$ equal to the latch-supplied current ($I_{out}$) divided by 32. Scaling factors of 1, 2, 3, 4, 5, 6 and 7 similarly engage x1/16, x1/8, x1/4, x1/2, x1, x2 and x4 scaling legs to yield correspondingly scaled output currents. As shown, the scaled output current is drawn from a PMOS mirroring circuit (implemented by diode-configured transistor 381 and four mirroring transistors 383) within mirroring output driver 353 to source replicated (mirrored) instances of $I_{out-sc}$ on respective output nodes of the neuron. Although four hardwired mirroring transistors 383 are shown (generating four replicated $I_{out-sc}$ signals), more or fewer mirroring transistors 383 may be provided together with circuitry for selectively disabling unused outputs (e.g., transistor switch elements in replicated current output path).

Still referring to FIG. 5, the quantity, range and granularity (step size) of the programmably selectable scaling factors may vary in alternative embodiments. Also, scaling may be effectively disabled or bypassed within scaling component 351 by selecting, in response to programmed configuration information, the (x1) scaling leg so that the scaling circuit sinks an unscaled (multiplied by one) replica of the latch output current. In alternative embodiments, scaling component 351 may be explicitly bypassed, for example, by configuring a multiplexer to route the current-mode latch output directly to mirroring output driver 353 instead of through the scaling component 351. In such an embodiment, an additional NFET current mirror circuit may be provided to reverse the direction of the current supplied to the mirroring output driver—sinking rather than sourcing $I_{out}$ to maintain the desired flow direction at the neural node output. In yet other embodiments, selective/programmatic scaling may be implemented within the current-mode latch itself, for example by coupling a scaled instance of diode-configured transistor 327 to the latch input node (i.e., to divert some programmed fraction of the current from the dynamic latch elements 301 and 303).

Figure 6:
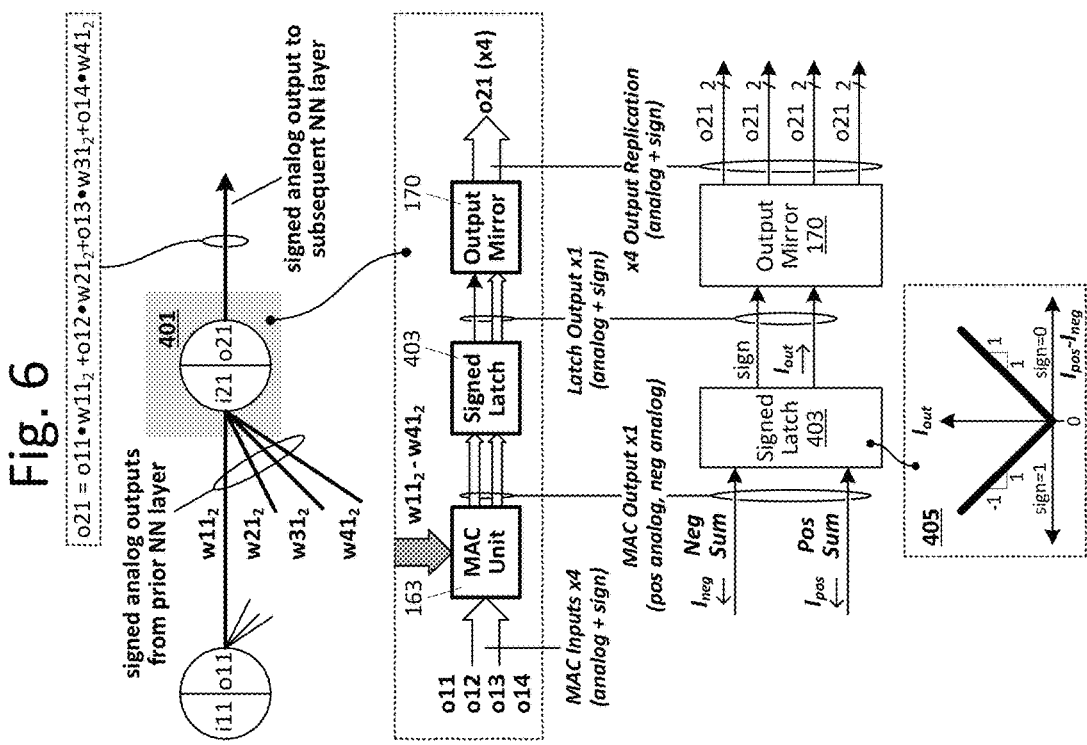
FIG. 6 illustrates an embodiment of a neural node that generates a signed analog output—a tuple of a product-magnitude and a logic '0' or logic '1' sign bit according to the predominance of negative and positive product accumulations.

FIG. 6 illustrates an embodiment of a neural node 401 that generates a signed analog output; a tuple of the product-magnitude discussed above and a logic '0' or logic '1' sign bit according to the predominance of negative and positive product accumulations. In the depicted implementation, neural node 401 includes a MAC unit 163 and output mirror 170 (with optional selective scaling) that operate as discussed above, but with a sign-bit-generating latch (signed latch) 403 in place of the rectifying latch of FIGS. 3 and 4. Signed latch 403 sources an output current ($I_{out}$) together with a sign bit to implement the dual-domain (positive and negative) function shown at 405. Note that the ramps in the positive and negative domains may have non-uniform and/or non-unity slopes (e.g., sub-unity slope in negative domain, unity slope in positive domain).

Figure 7:
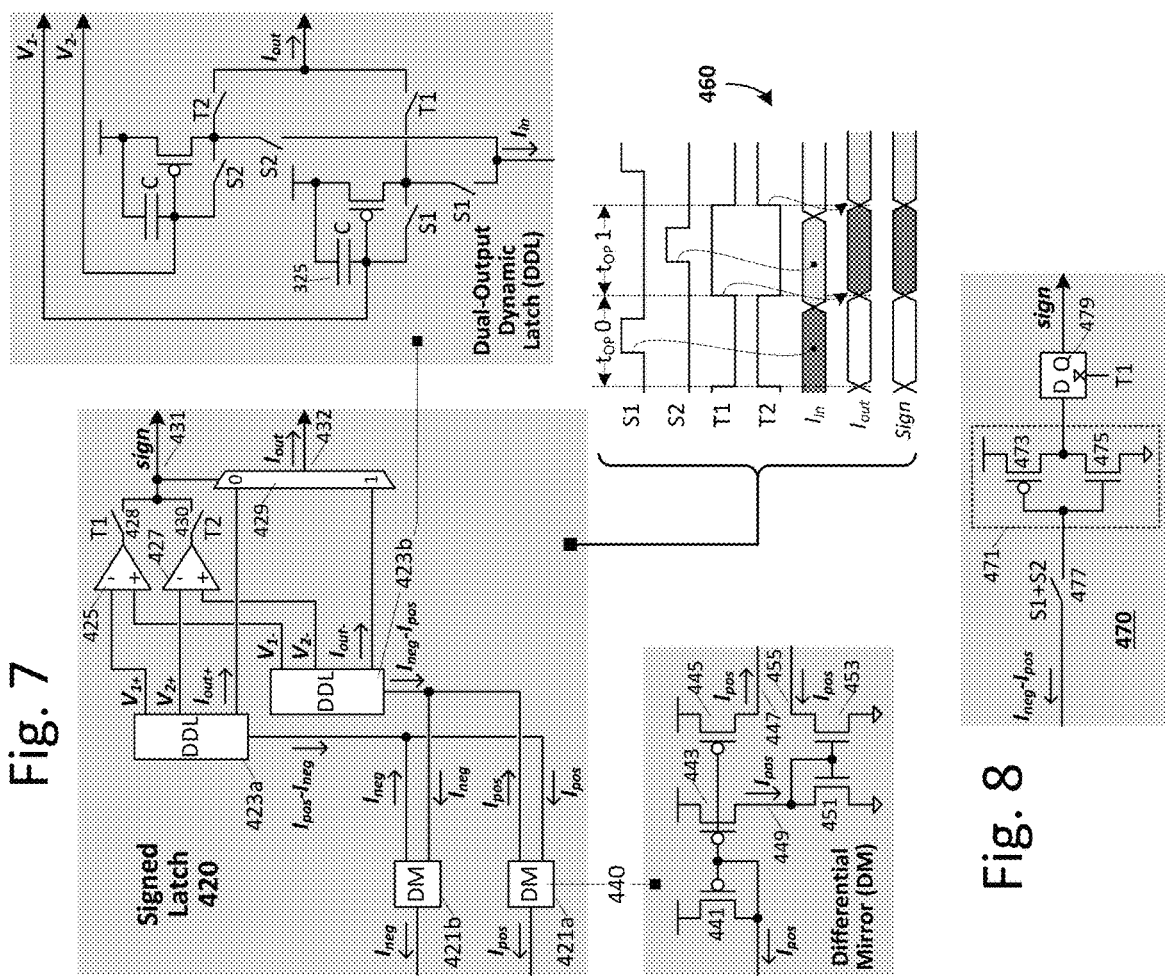
FIG. 7 illustrates an embodiment of a signed latch.

FIG. 7 illustrates an embodiment of a signed latch 420 having differential mirrors 421a and 421b (DM), dual-output dynamic latches 423a and 423b (DDL), comparators 425 and 427, and output multiplexer 429. As shown, differential mirrors 421a/421b are coupled to the positive and negative product accumulation lines, respectively, and generate replicated, counter-flowing instances of the accumulation-line current. Referring to detail view 440, for example, differential mirror 421a includes a dual output current mirror (implemented by gate-coupled PMOS transistors 441, 443 and 445) to produce out-flowing instances of the positive-accumulation current ($I_{pos}$) on output line 447 and drain-line 449, and an NMOS current mirror (implemented by diode-configured transistor 451 and mirror transistor 453) to draw a replica of $I_{pos}$ on output line 455. Differential mirror 421b performs the same function for the negative-accumulation current to produce counter-flowing $I_{neg}$ instances. The outputs of differential mirrors 421a and 421b are cross-coupled to one another at respective inputs of the dual-output dynamic latches 423a and 423b to draw $I_{pos}$ minus $I_{neg}$ at the input of "positive-output" dynamic latch 423a and $I_{neg}$ minus $I_{pos}$ at the input of "negative-output" dynamic latch 423b—an arrangement that will yield a nonzero output current at one latch or the other (423a or 423b) according to whether the positive and negative product accumulations output by the MAC unit are predominantly positive or negative (or a zero output current from both latches 423a and 423b if the MAC-unit outputs nominally match).

Still referring to FIG. 7, each of the dual-output dynamic latches operates generally as described in reference to FIG. 4, with the voltages on the two capacitive nodes 325 (i.e., "gate voltages") within each latch delivered to respective voltage comparators 425 and 427. More specifically, the gate voltages from the two dynamic latch elements within the positive latch (423a) are supplied to respective '+' inputs of comparators 425 and 427, and gate voltages from the dynamic latch elements within negative latch 423b are supplied to '−' inputs of those comparators. By this arrangement, during a capture phase within a given pair of dynamic latch elements (which occurs simultaneously within one dynamic latch element within positive latch 423a and one dynamic latch element within negative latch 423b), the gate voltage generated within either the positive latch or the negative latch will drop to enable current flow (i.e., gate voltage within positive latch 423a will drop if $I_{pos}$>$I_{neg}$ and gate voltage within negative voltage 423b will drop if $I_{neg}$>$I_{pos}$) while the gate voltage within the other of the positive and negative latches will be or remain pulled up to (or near) the VDD potential (i.e., less than a threshold drop below VDD). Accordingly, during the capture phase within a given pair of dynamic latch elements effected by assertion of signal S1, the gate voltages for those dynamic latch elements ($V_{1+}$ and $V_{1−}$) will diverge at the input of comparator 425, yielding, as a sign bit for the latched magnitude signal, a logic '0' comparator output if the positive-latch gate voltage (v1+) drops below the negative-latch gate voltage (v1−) and a logic '1' comparator output if V1− drops below V1+. Comparator 427 will generate a like sign bit for the dynamic-latch-element capture phase effected by assertion of S2 (i.e., comparing $V_{2+}$ and $V_{2-}$). Accordingly, during the ensuing transmit phase for a given dynamic latch element pair (i.e., when T1 is asserted for the latch elements that generate $V_{1+}/V_{1-}$, and when T2 is asserted for the dynamic latch elements that generate $V_{2+}$ and $V_{2-}$), either comparator 425 or comparator 427 will drive a sign bit corresponding to $I_{out}$ onto line 431 via switch element 428 or switch element 430, respectively. In the embodiment shown, the sign bit is supplied to multiplexer 429 to select either positive latch 423a or negative latch 423b to drive the $I_{out}$ node (432) of the signed latch. In alternative embodiments, the magnitude outputs ($I_{out}$) of the positive and negative latches (423a, 423b) may simply be wired together to form the magnitude output (432) of the signed latch—that is, at least one of the two dual-output dynamic latches (423a or 423b) will source no current (zero output) during a given transmit phase—effectively tri-state via open-drain output—so that the other of the dual-output dynamic latches can drive output node 432 without conflict or perturbance. Detail view 460 presents the capture-phase/transmit-phase timing diagram of FIG. 4, supplemented to show pipelined sign-bit generation.

Figure 8:
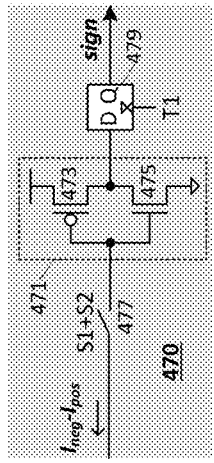
FIG. 8 illustrates an alternative sign-bit generator that may be deployed within the signed latch of FIG. 7.

FIG. 8 illustrates a sign-bit generator 470 that may be deployed within the signed latch of FIG. 7 instead of the comparators 425/427 and switch elements 427/430. As shown, a differential input, Ineg minus Ipos, is supplied to an inverting amplifier (e.g., inverter 471 implemented by PMOS and NMOS transistors 473 and 475) during each capture phase within the dual-output dynamic latches 423a/423b (i.e., capture phase resulting from S1 or S2 assertion as indicated by switch element 477). In the case of a predominantly negative product accumulation ($I_{neg} > I_{pos}$), the inverter input (gates of transistors 473 and 475) will be discharged low, switching on transistor 473 (and switching off transistor 475) to produce a logic '1' inverter output (i.e., the interconnected drains of transistors 473 and 475) and thus a negative sign bit. Conversely, in the case of a predominantly positive product accumulation ($I_{pos} > I_{neg}$), the inverter input will be charged to a relatively positive potential, switching on transistor 475 (and switching off transistor 473) to pull the inverter output low and thus produce a positive sign bit. In the depicted embodiment, the inverter output is supplied to flop stage 479 which registers the product sign in response to both rising and falling edges of T1 (or another clock signal or set of signals that transition (s) prior to each transmit phase), thereby latching the product sign throughout the transmit phase of the corresponding magnitude signal ($I_{out}$).

Figure 9:
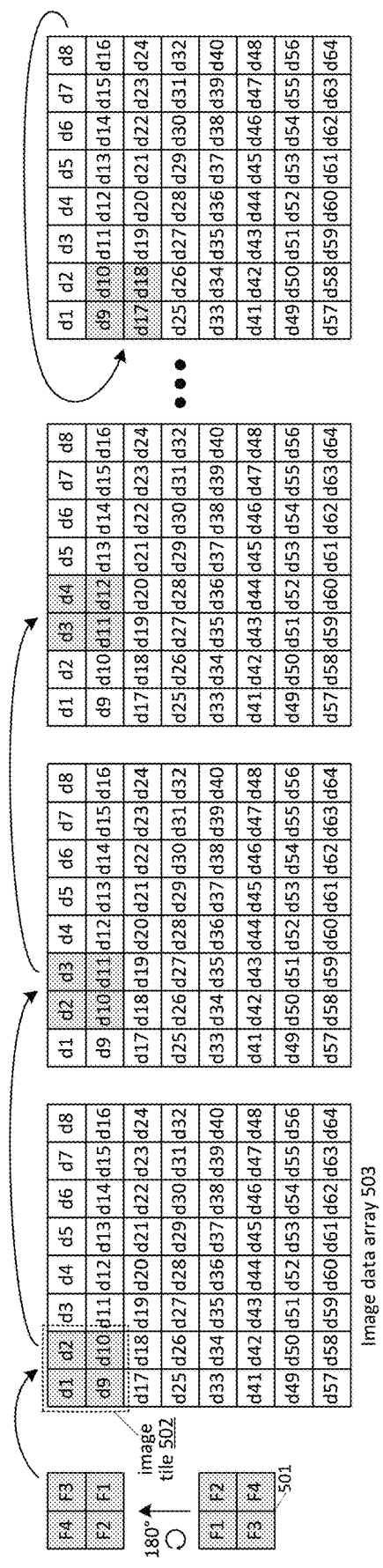
FIG. 9 illustrates an exemplary feature identification operation that may be implemented within the neural-net engine of FIG. 1.

FIG. 9 illustrates an exemplary feature identification operation that may be implemented within the neural-net engine of FIG. 1. As show, a 2×2 filter matrix 501 is applied to respective 2×2 "tiles" within an image data array 503—in this example an 8×8 array containing 64 image data values (e.g., 64 pixel values), though in practice the image data array will generally include many millions of image data values (or more). As shown, the filter matrix is rotated 180 degrees and then iteratively applied to a sliding tile-selection window, shifting the window by one column of the image data array in each iteration until a final tile in a given row-pair is reached and then shifting the window by one row, repeating this inner-loop column progression, outer-loop row progression until the filter matrix has been applied to all distinct tiles in the image data array.

Figure 10:
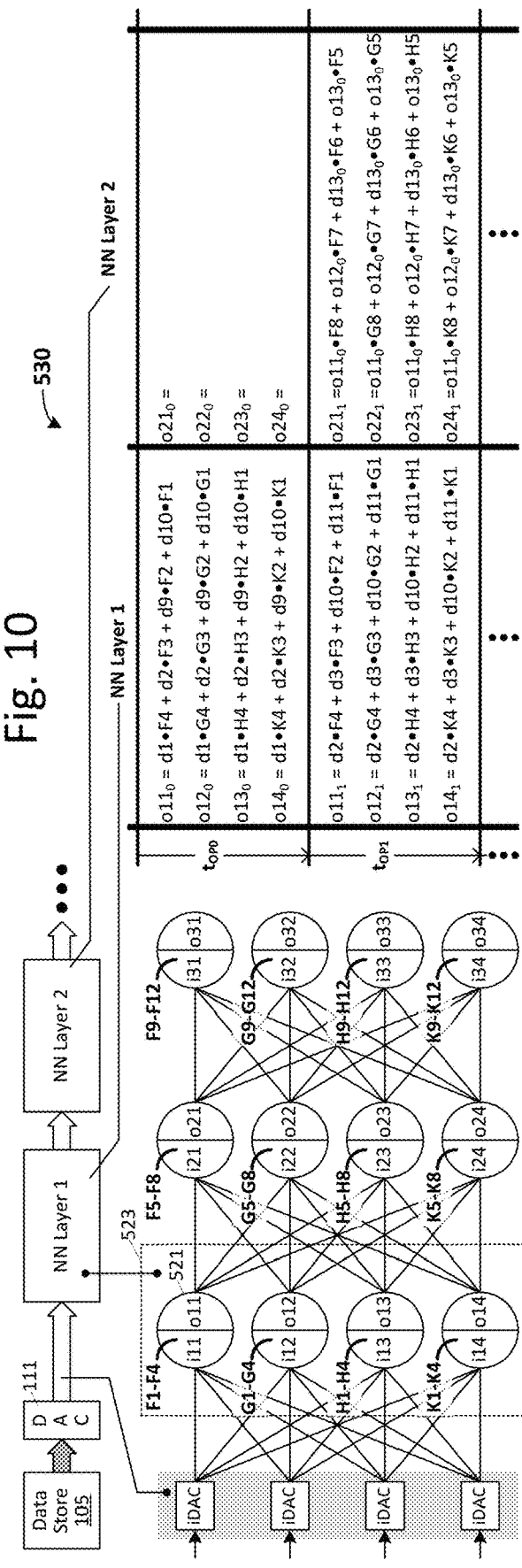
FIG. 10 illustrates exemplary implementation of the tiled 2×2 image data filtering shown in FIG. 9 within the die-integrated neural network discussed above.

FIG. 10 illustrates exemplary implementation of the tiled 2×2 image data filtering shown in FIG. 9 within the die-integrated neural network discussed above. As shown, a set of four weighting data values (F1-F4) representative of the 2×2 filter matrix shown in FIG. 9 is applied within neural node 521 to a corresponding set of four signed-analog input data values (i.e., from input data store 105 via DAC 111), the latter constituting a 2×2 image data tile during a given operation interval ($t_{OP}$) and thus a data tile that is column-shifted and/or row-shifted from one operation interval to the next. As shown, other neural nodes within the same neural-net layer (523) as node 521 may apply other 2×2 filters (G1-G4, H1-H4, K1-K4) so that multiple filters may be applied simultaneously to each image data tile. Further, one or more additional neural net layers may apply other 2×2 filters to the outputs of the prior-layer neural nodes—overall yielding pipelined neural-net processing within respective neural net layers as shown at 530.

Figure 11:
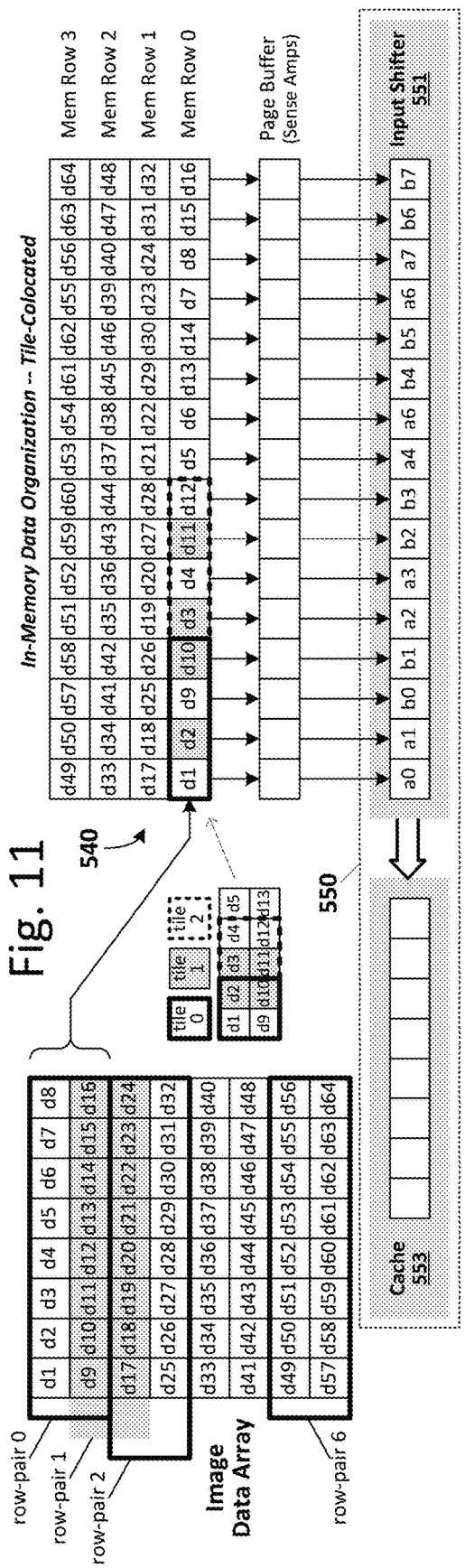
FIG. 11 illustrates an in-memory data organization and neural-net data delivery circuit that may be applied within the neural net engine of FIG. 1 to avoid both redundant data retrieval from the input data memory and unduly long on-chip data transmission/routing.

FIG. 11 illustrates an in-memory data organization (540) and neural-net data delivery circuit (550) that may be applied within the neural net engine of FIG. 1 to avoid both redundant data retrieval from the input data memory (e.g., DRAM) and unduly long on-chip data transmission/routing per operational interval. As shown, instead of storing image data co-located exclusively by image-array column (or exclusively by row) per convention, data is stored in a tile-colocated format—all constituent data values of a given N×N tile disposed within the same data storage row within a set of $N^2+N$ (or $2N^2$ or fewer) contiguous column locations. For example, constituent data values for each of the first three 2×2 image tiles—tile-0, tile-1 and tile-2—progressing in single column steps across the top two rows of the image data array (i.e., across row-pair 0 of the image data array) are co-located within the leftmost eight column locations of DRAM row 0—that is, with data for image tiles 0 and 2 shown in bolded-outline and dashed-outline, respectively, and disposed adjacent sets of $N^2=4$ column locations, and data for image tile 1 disposed in shaded locations distributed discontiguously across $N^2+N=6$ column locations. The remaining 2×2 tiles within row-pair 0 of the image array are likewise co-located within DRAM row 0—an approach that enables re-use of data appearing redundantly in adjacent tiles of the image array without requiring redundant storage. Further, because constituent values of each image N×N image tile are disposed adjacent one another or with limited dispersion (not more than N intervening column locations), data need not be conveyed over extended distances to feed the neural net processing pipeline.

In the FIG. 11 example, row-pairs within the image data array (i.e., each constituting row of overlapping 2×2 data tiles) are coextensive with DRAM page size so that each DRAM row activation loads the DRAM page buffer (sense amplifier bank) with all data needed to process constituent data tiles of the image row pair (in the more general case in which image array dimension exceeds page buffer size, each row activation may load a portion of a row-pair according to relative sizes of the page buffer and image array with the row-pair fraction viewed as a constituent of a M×M component of the larger image array). In one embodiment, only non-overlapping row pairs are stored in the DRAM core to avoid data-storage redundancy—storing row-pair 0 of the image data array in memory row 0, for example, and storing row-pair 2 in memory row 1, but not separately storing row-pair 1—and then synthesizing intervening/overlapping row-pairs within the data delivery circuitry 550 by selectively caching and re-circulating image data values for re-use (re-application to neural network). In the depicted implementation, the data delivery circuit includes a dual-output shift register 551 referred to herein as an input shifter and a re-use cache 553 (or "cache" for short). Image data from a given memory-row is transferred to the DRAM page buffer in a row activation and then parallel-loaded into input shifter 551, freeing the DRAM for precharge and subsequent row activation while the input shifter delivers image data tiles sequentially to the neural network.

Figure 12:
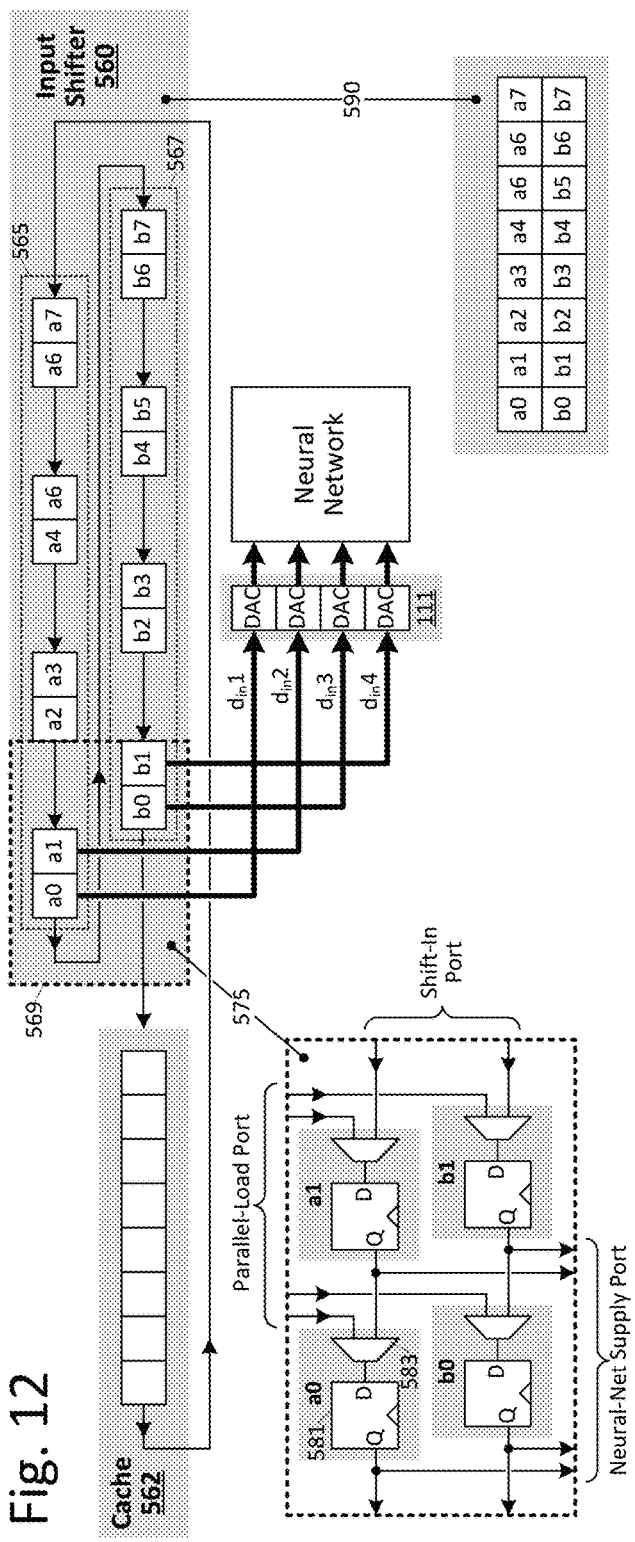
FIG. 12 illustrates more detailed embodiments of an input shifter and re-use cache that may be used to implement the data delivery circuit of FIG. 11.

FIG. 12 illustrates more detailed embodiments of an input shifter 560 and re-use cache 562 that may be used to implement the data delivery circuit of FIG. 11. In the 2×2 data-tile example presented, alternating pairs of storage elements within the input shifter are interconnected to form a parallel pair of shift-registers—a tile-top shift-register 565 implemented by daisy-chained (input-to-output connected) storage elements a0, a1, a2, a3, etc. and a tile-bottom shift-register 567 implemented by daisy-chained storage elements b0, b1, b2, b3, etc. Moreover, the leading two (leftmost, head of queue) storage elements within the tile-top and tile-bottom shift registers constitute an exemplary 2×2 tile-data delivery port 569, outputting four digital data values corresponding to the resident image tile (i.e., resident within storage elements a0, a1, b0, b1) to the neural network via input DAC 111.

Detail view 575 illustrates an exemplary implementation of 2×2 data delivery port 569 and constituent storage elements a0, a1, b0 and b1. As shown with respect to element a0, each of the storage elements includes a flop stage 581 (depicted as an edge-triggered data flip-flop, though various level-triggered elements may be used) and an input multiplexer 583, the latter to allow data load from either the DRAM page buffer or the upstream storage element (to effect shift-register function. Other storage elements within input shifter 560 are implemented generally as shown at 575 (flop-stage 581 and multiplexer 583, with outputs of storage elements a2 and a3 coupled to the shift-in port of data-delivery port 569), but with tail storage elements of the tile-top and tile-bottom shifters 565, 567 coupled to a data re-circulation source and with those other storage elements generally (or optionally) lacking the additional output connections that constitute the neural-net supply port. In one embodiment, the re-use cache is also implemented by a shift register having storage elements generally as shown in detail view 575, but with the parallel-load input replaced by a feedback connection to the storage element output to enable assertion of a register-hold state (i.e., multiplexer 583 couples output of flop stage 581 to input of flop stage 581 so that content of flop stage 581 is maintained—no shift).

Referring to FIGS. 11 and 12 and observing that each odd-numbered row-pair within the image data array is constituted by the bottom row ("tile-bottom") of the preceding even-numbered row-pair and the top row ("tile-top") of the succeeding even-numbered row-pair (e.g., odd-numbered row-pair 1 is constituted by bottom row of row-pair 0 and top row of row-pair 2), it follows that by shifting the bottom row of row-pair 0 into re-use cache 562 during row-pair 0 processing and then, during subsequent processing of row-pair 2, shifting (i) the contents of re-use cache 562 (bottom row of row-pair 0) into tile-top shift register 565 and (ii) contents of tile-top register 565 (the top row of row-pair 2) into tile bottom shift register 567, the input shifter 560 is loaded with contents of row-pair 1 without requiring data re-load from the DRAM. To implement this data re-circulation (data re-use), the head-of-queue output of re-use cache 562 is coupled to the shift-in port of tail-of-queue element a7 within tile-top shift register 565, the head-of queue output of tile-top shift register 565 is supplied to the shift-in port of tail-of-queue element b7 within tile-bottom shift register 567, and the head-of-queue output of tile-bottom shift register 567 is supplied to the tail-of-queue shift-in port of re-use cache 562.

Figure 13:
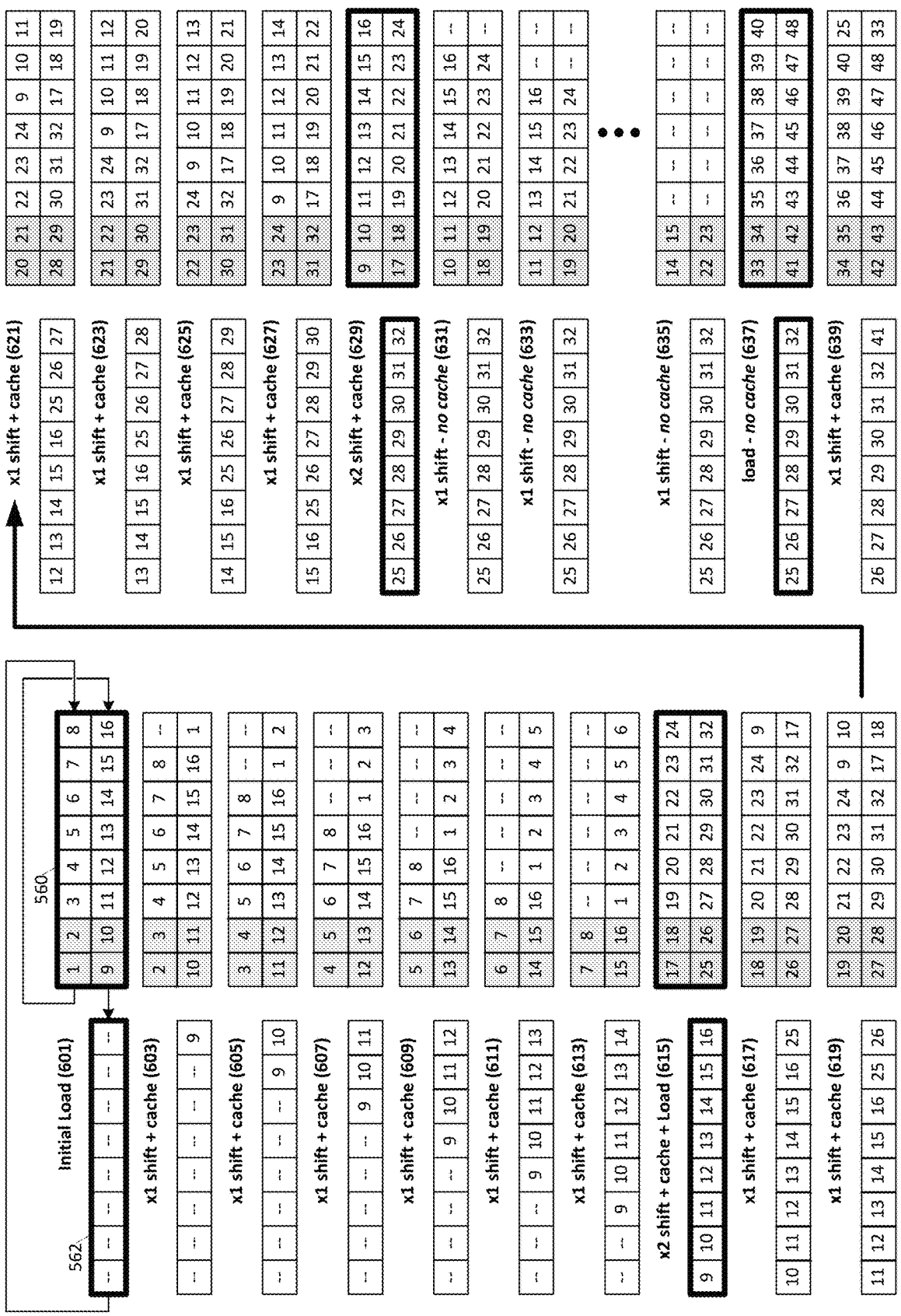
FIG. 13 illustrates an exemplary data delivery sequence applying the input shifter and re-use cache of FIG. 12.

FIG. 13 illustrates an exemplary data delivery sequence applying the input shifter and re-use cache of FIG. 12, depicting the input shifter in simplified form (i.e., as shown at 590 in FIG. 12). After an initial load from the DRAM page buffer at 601, image row-pair 0 is resident within the input shifter 560 (i.e., top row of row-pair 0 resident in tile-top shifter and bottom row of row-pair 0 in tile-bottom shifter) and re-use cache 562 is empty (or contains null data). At this point, the data delivery port (shaded at leftmost end of input shifter 562) outputs the left-most 2×2 image data tile (d1, d2, d9, d10, though the 'd' is dropped in FIG. 13) to the data input port of the neural network (e.g., via current-mode DAC as discussed above). After a x1 shift and cache operation (603), data is shifted by one column within input shifter 560 such that the next 2×2 data tile (i.e., "tile 1" as shown in FIG. 11) is shifted into the data delivery port. In that same operation, the head-of-queue data value within the tile-bottom shifter is loaded into the tail-of-queue location within the re-use cache 562, head-of-queue data value within the re-use cache (null data in this example) is loaded into the tail-of-queue location within the tile-top shift register (top row of input shifter 560), and the head-of-queue data value within the tile-top shifter is loaded into the tail-of-queue location within the tile-bottom shift register (bottom row of input shifter 560). These same x1 shift (single-column shift) and cache operations are carried out at 605, 607, 609, 611 and 613 to shift each of the remaining five 2×2 data tiles within image row-pair 0 to the data delivery port of input shifter 560 and to load the re-use cache with the bottom row of row-pair 0. After advancing to the final 2×2 data tile (as shown at 613), a x2 shift and data load is executed at 615 to (i) transfer two head-of-queue data values from the tile-bottom shifter to the re-use cache tail, from the re-use cache to the tail of the tile-top shifter, and from the tile-top shifter to the tail of the tile-bottom shifter; and (ii) load a new row-pair—advanced by two image array rows from the previously loaded row-pair so that no redundant data load occurs—from the DRAM page buffer into input shifter 560. Thus, after the x2 shift, cache and data load shown at 615 (bold-outlined input shifter and re-use cache for emphasis), row-pair 2 of the image data array is resident within the input shifter 560 (with the leftmost tile thereof stored within the shift-register elements that constitute the data delivery port), and the bottom row from row-pair 0 is resident within re-use cache 562. Note that the data shifted into the tail-ends of tile-top and tile-bottom shifters in operations 603-615 is unused and overwritten by the new row-pair load—a non-use that occurs only with respect to the initially loaded row-pair (row-pair 0) and with respect to odd-numbered row-pairs as discussed below.

Following the operation at 615, another sequence of six x1-shift and cache operations are carried out at 617, 619, 621, 623, 625 and 627 to: (i) advance the remaining six 2×2 data tiles in row-pair 2 one-by-one to the data delivery port, (ii) shift the contents of the re-use cache into the tile-top shifter (and thus load tile-top shifter with the bottom row from row-pair 0), shift the contents of tile-top shifter into the tile-bottom shifter (and thus load tile-bottom shifter with the top row from row-pair 2), and shift the contents of the tile-bottom shifter into the re-use cache (thus storing the bottom row of row-pair 2 for subsequent re-use). The x2 shift and cache operation at 629 completes the transfer of the top and bottom rows of row-pair 1 into input shifter 560 (i.e., from the cache register and tile-top shifter, respectively) and the caching of the bottom row of row-pair 2. At this point, input shifter 560 contains the top and bottom rows of row-pair 1 and re-use cache 562 contains the bottom row of row-pair 2.

Still referring to FIG. 13, the odd-numbered row-pair is advanced column by column through input shifter in x1 shift operations 631, 633, . . . , 635—as before with the two bounding row-pairs (row-pair 0 and row-pair 2) but without overwriting the contents of the are-use cache register (e.g., re-use maintained in a "hold" state as the constituent tiles of row-pair 1 are advanced to the data delivery report). After the final 2×2 tile within row-pair 1 has advanced to the data-delivery port (635), an input-shifter load operation 637 is executed without cache or shift to load a subsequent even-numbered row-pair—row-pair 4 in this case) into input shifter 560. Because the input shifter content is overwritten by the data load at 637, data need not be (but may nonetheless be) shifted from the re-use cache and tile-top shifter into the tile-top shifter and tile-bottom shifter, respectively, during the odd row-pair progressions 631-635. In any case, after row-pair load at 637 a sequence of x1-shift and cache operations (only one of which is shown (639)) are carried out as at 617-627 followed by a x2 shift and cache as at 629 to (i) advance each constituent data tile of row-pair 4 to the data delivery port, (ii) cache the bottom row of row-pair 4, and (iii) load the input shifter with row-pair 3, drawing the tile-top and tile-bottom thereof from the row-cache (tile-bottom of row-pair 2) and the tile-top of row-pair 4.

Figure 14:
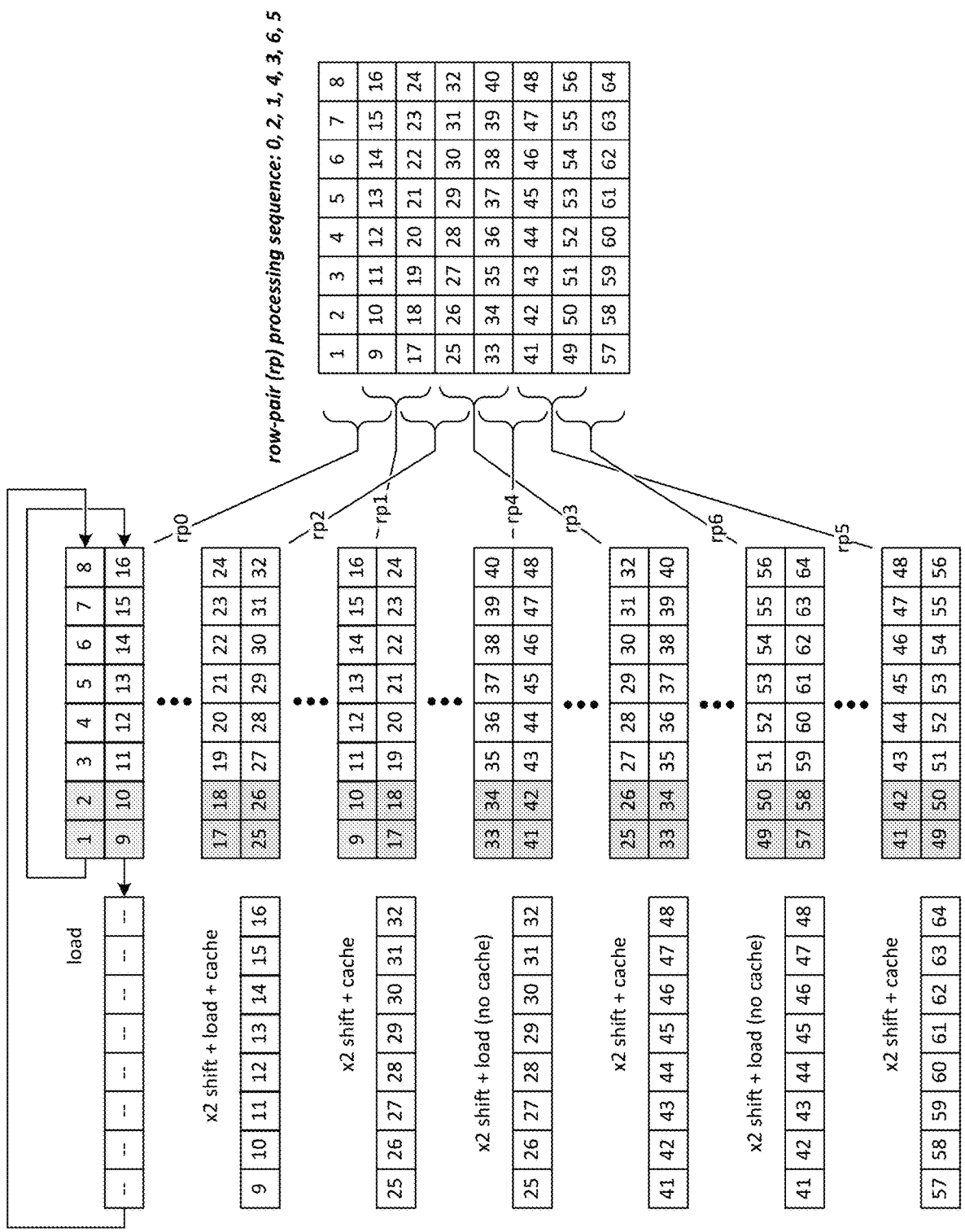
FIG. 14 illustrates sequencing of respective image-array row pairs effected by iterative execution of the shifting and caching operations shown in FIG. 13.
Figure 15:
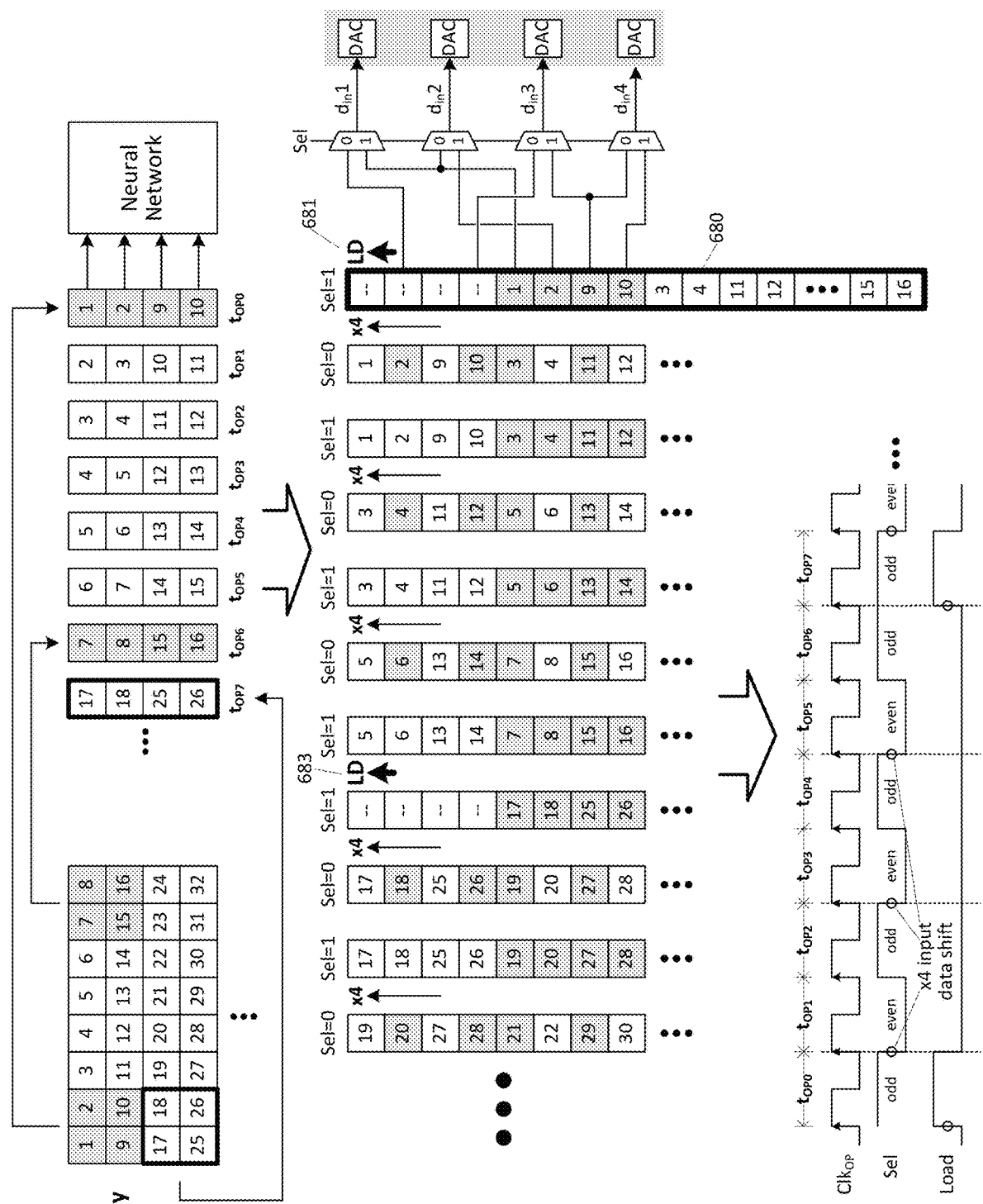
FIG. 15 illustrates an alternative input shifter embodiment that includes both pointer-selection and data shifting functions to enable x4 data shifting through contents of an input buffer.

FIG. 14 illustrates the overall sequencing of the seven row pairs (rp0, rp1, rp2, . . . , rp6) effected by iterative execution of the shifting and caching operations of FIG. 13. In a number of embodiments, DRAM data retrieval—row-activation in particular—is hidden under the input shifter progression to form a data delivery pipeline. That is, after data from a given row-pair is transferred from the DRAM page buffer to the input shifter, data is advanced through the data delivery port as discussed above (caching and recirculating as necessary to enable data re-use without resort to the DRAM page buffer) concurrently with execution of DRAM precharge and row activation operations to reload the DRAM page buffer with data from a subsequent row-pair (i.e., row-pair containing no data redundancy with respect to previously loaded row-pair). In a number of embodiments, this concurrency is facilitated by implementing a wide I/O interface within the DRAM—for example, enabling transfer of the entirety of the page buffer content to the input shifter in a unified data-load operation (instead of successive transfers of narrower columns of data). In other embodiments, data is transferred column-by-column from the page buffer to the input shifter, with precharge/row-activation executed after final column transfer (to the input shifter) and concurrently with input shifter progression. In yet other embodiments, the input shifter may be implemented in whole or part within the DRAM page buffer itself (e.g., providing for data shift between constituent sense-amplifier elements of the page buffer). Further, instead of shifting data through an input shifter (implemented within or separately from the page buffer), pointers may be used to track head-of-queue and tail-of-queue locations within circulating-buffer implementations of the input shifter (and/or re-use cache). In one embodiment, for example, multiplexer circuitry (or other switching/selector circuitry) is provided to enable progressive selection of data tiles (i.e., without data transfer between storage elements) and delivery of those data tiles to the neural net input. In yet other embodiments, some combination of pointer-based tile selection and data shifting is implemented. FIG. 15 illustrates, for example, an input shifter embodiment that includes both pointer-selection and data shifting functions to enable x4 data shifting through contents of an input buffer. In the embodiment shown, row-pair data is loaded into a single-file input shifter 680 and then x4 advanced after every two image tile readouts. More specifically, after initial load as shown at 681 ("LD"), an even/odd pointer ("Sel") is set to an odd state (Sel=1) to select an initial 2×2 data tile (containing image data values d1, d2, d9 and d10 as shaded). Thereafter, a x4 shift is executed ("x4") to advance the contents of the input shifter, with the even/odd pointer initially set to select even-phase data tile (d2, d3, d10 and d11) and then odd-phase data tile (d3, d4, d11, d12) in respective operational intervals—a progression that is iterated (x4 shift per each even/odd data selection operation) until all initially loaded data has been processed, and then followed by a subsequent data load at 683. Though not specifically shown, data may be cached as discussed above to avoid redundant load from core memory. More generally, the various data delivery circuits, filters, in-memory data organizations and so forth presented in context of 2×2 image tile processing may be readily modified/extended for use with 3×3 image tiles, 4×4 image tiles and general-case N×N image tiles (and corresponding filter sizes) to reduce the number of fetches from a DRAM or other memory core (and data path lengths from memory core to neural-net input)—improving performance and saving power.

The various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the memory array (or subarray) sizes, matrix sizes, buffer sizes, bit-depths, number of neural-net layers, storage cell technologies, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line (e.g., with digital or analog signals time-multiplexed thereon), and each of the single signal lines can alternatively be a bus. Signals and signaling links, however shown or described, can be single-ended or differential. Logic signals shown as having active-high assertion or "true" states, may have opposite assertion states in alternative implementations. Circuit functions implemented with PMOS transistors may be implemented instead with NMOS transistors (and vice-versa), with appropriate changes in transistor source connections (e.g., to opposite polarity voltage rails). A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An integrated-circuit neural network (neural network IC) comprising:
   a first multiplier circuit to multiply a first current-mode data signal with a first digital weighting value to generate a first current-mode product signal on a first multiplier output line;
   a second multiplier circuit to multiply a second current-mode data signal with a second digital weighting value to generate a second current-mode product signal on a second multiplier output line;
   first and second product accumulation lines;
   first switching circuitry to couple the first multiplier output line to either the first product accumulation line or the second product accumulation line according to whether a first data sign bit corresponding to the first current-mode data signal matches a first weighting sign bit corresponding to the first digital weighting value; and
   second switching circuitry to couple the second multiplier output line to either the first product accumulation line or the second product accumulation line according to whether a second data sign bit corresponding to the second current-mode data signal matches a second weighting sign bit corresponding to the second digital weighting value.

2. The neural network IC of claim 1 wherein the first and second product accumulation lines are coupled via load elements to a voltage supply node such that:
   a sum of the first and second current-mode product signals will flow on the first product accumulation line if the first data sign bit matches the first weighting sign bit and the second data sign bit matches the second weighting sign bit;
   a sum of the first and second current-mode product signals will flow on the second product accumulation line if the first data sign bit does not match the first weighting sign bit and the second data sign bit does not match the second weighting sign bit; and
   the first and second current-mode product signals will flow on the first and second product accumulation lines, respectively, if the first data sign bit matches the first weighting sign bit and the second data sign bit does not match the second weighting sign bit.

3. The neural network IC of claim 2 wherein the load elements comprise respective diode-configured transistors.

4. The neural network IC of claim 1 further comprising circuitry coupled to the first and second product accumulation lines to generate, as a third current-mode product signal, a current mode signal having a current flow amplitude corresponding to a difference between amplitudes of current mode signals flowing on the first and second product accumulation lines.

5. The neural network IC of claim 4 further comprising an analog latch having an input node through which the third current-mode product signal flows.

6. The neural network IC of claim 5 wherein the analog latch records a first analog value corresponding to the third current-mode product signal during a first capture interval and then, during a first transmit interval that transpires after conclusion of the first capture interval, generates a current-mode latch-output signal corresponding to the first analog value and nominally equal to the third current-mode product signal.

7. The neural network IC of claim 6 wherein a fourth current-mode product signal flows through the input node of the latch during the first transmit interval and wherein the analog latch records a second analog value corresponding to the fourth current-mode product signal during a second capture interval that transpires concurrently with the first transmit interval.

8. The neural network IC of claim 6 further comprising a scaling circuit to scale the current-mode latch-output signal by a scaling factor.

9. The neural network IC of claim 8 further comprising a configuration circuit and wherein the scaling factor is programmed within a configuration circuit.

10. The neural network IC of claim 4 further comprising circuitry to generate a sign bit having either a first logic state or a second logic state according to whether current flow amplitude on the first product accumulation line exceeds current flow amplitude on the second product accumulation line.

11. A method of operation within an integrated-circuit neural network (neural network IC), the method comprising:

multiplying a first current-mode data signal with a first digital weighting value to generate a first current-mode product signal on a first multiplier output line;

multiplying a second current-mode data signal with a second digital weighting value to generate a second current-mode product signal on a second multiplier output line;

switchably coupling the first multiplier output line to either a first product accumulation line or a second product accumulation line according to whether a first data sign bit corresponding to the first current-mode data signal matches a first weighting sign bit corresponding to the first digital weighting value; and switchably coupling the second multiplier output line to either the first product accumulation line or the second product accumulation line according to whether a second data sign bit corresponding to the second current-mode data signal matches a second weighting sign bit corresponding to the second digital weighting value.

12. The method of claim 11 wherein:

switchably coupling both the first and second multiplier output lines to the first product accumulation line yields a current-mode sum of the first and second current-mode product signals on the first product accumulation line;

switchably coupling both the first and second multiplier output lines to the second product accumulation line yields a current-mode sum of the first and second current-mode product signals on the second product accumulation line; and switchably coupling the first and second multiplier output lines to respective ones of the first and second product accumulation lines yields a dual output signal indicative of a difference between the first and second current-mode product signals.

13. The method of claim 11 further comprising generating, as a third current-mode product signal, a current mode signal having a current flow amplitude corresponding to a difference between amplitudes of current mode signals flowing on the first and second product accumulation lines.

14. The method of claim 13 wherein generating the third current-mode product signal comprises generating, as the third current-mode product signal, a current flow through an input of an analog latch.

15. The method of claim 14 further comprising recording, within the analog latch, a first analog value corresponding to the third current-mode product signal during a first capture interval and then, during a first transmit interval that transpires after conclusion of the first capture interval, generating a current-mode latch-output signal corresponding to the first analog value and nominally equal to the third current-mode product signal.

16. The method of claim 15 further comprising:

generating a fourth current-mode product signal at the input node of the latch during the first transmit interval; and recording, within the analog latch, a second analog value corresponding to the fourth current-mode product signal during a second capture interval that transpires concurrently with the first transmit interval.

17. The method of claim 15 further comprising scaling the current-mode latch-output signal by a scaling factor.

18. The method of claim 17 further comprising storing the scaling factor within a configuration circuit of the neural network IC.

19. The method of claim 13 further generating a sign bit having either a first logic state or a second logic state according to whether current flow amplitude on the first product accumulation line exceeds current flow amplitude on the second product accumulation line.

20. An integrated-circuit neural network (neural network IC) comprising:

means for multiplying a first current-mode data signal with a first digital weighting value to generate a first current-mode product signal on a first multiplier output line;

means for multiplying a second current-mode data signal with a second digital weighting value to generate a second current-mode product signal on a second multiplier output line;

means for coupling the first multiplier output line to either a first product accumulation line or a second product accumulation line according to whether a first data sign bit corresponding to the first current-mode data signal matches a first weighting sign bit corresponding to the first digital weighting value; and means for coupling the second multiplier output line to either the first product accumulation line or the second product accumulation line according to whether a second data sign bit corresponding to the second current-mode data signal matches a second weighting sign bit corresponding to the second digital weighting value.

* * * * *